US011876195B1

(12) United States Patent
Carlson et al.

(10) Patent No.: US 11,876,195 B1
(45) Date of Patent: Jan. 16, 2024

(54) MITIGATING DISTRIBUTION OF DEBRIS ASSOCIATED WITH A CATASTROPHIC FAILURE OF A BATTERY CELL

(71) Applicant: NDSL, Inc., Raleigh, NC (US)

(72) Inventors: James Bruce Carlson, Durham, NC (US); Nathan Herbert Hillery, Durham, NC (US)

(73) Assignee: NDSL, Inc., Raleigh, NC (US)

( * ) Notice: Subject to any disclaimer, the term of this patent is extended or adjusted under 35 U.S.C. 154(b) by 0 days.

(21) Appl. No.: 17/669,147

(22) Filed: Feb. 10, 2022

(51) Int. Cl.
*H01M 10/54* (2006.01)
*H02J 9/06* (2006.01)
*H01M 10/0525* (2010.01)

(52) U.S. Cl.
CPC ....... *H01M 10/54* (2013.01); *H01M 10/0525* (2013.01); *H02J 9/061* (2013.01); *H02J 9/062* (2013.01)

(58) Field of Classification Search
CPC .... H01M 10/54; H01M 10/0525; H02J 9/061; H02J 9/062
USPC ..................... 307/66
See application file for complete search history.

(56) References Cited

U.S. PATENT DOCUMENTS 4,609,238 A * 9/1986 Jamgotchian .......... H01R 11/30 439/727
5,575,907 A 11/1996 Lindermann
2005/0183555 A1 8/2005 Santos et al.
2008/0182215 A1* 7/2008 Sid .................. G01N 33/004 431/18
2009/0309745 A1* 12/2009 Johnson .............. G06F 11/3476 340/635
2017/0077729 A1* 3/2017 Sato .................. H02J 7/02
2017/0163055 A1* 6/2017 Ko .................. H02J 9/062
2019/0170337 A1* 6/2019 Schlafer .................. F21V 23/04
2020/0331003 A1 10/2020 Kochhar et al.
2022/0320608 A1* 10/2022 Sarkar .................. H01M 4/133
2022/0320631 A1* 10/2022 Day .................. H01M 10/6564
2022/0393258 A1* 12/2022 Fahad .................. H01M 10/48

FOREIGN PATENT DOCUMENTS

| | | | |
|---|---|---|---|
| CN | 100467145 C | | 3/2009 |
| CN | 100514745 C | | 7/2009 |
| CN | 204793009 | * | 11/2015 |
| CN | 108539312 A | | 9/2018 |
| CN | 109411842 A | | 3/2019 |
| CN | 106910889 B | | 7/2019 |
| CN | 211099406 U | | 7/2020 |
| JP | 2015516653 A | | 6/2015 |
| KR | 101275849 B1 | | 6/2013 |
| KR | 20170049197 | * | 5/2017 |

* cited by examiner

*Primary Examiner* — Richard Tan
(74) *Attorney, Agent, or Firm* — NK Patent Law

(57) ABSTRACT

Disclosed herein are methods, systems, and devices for mitigating distribution of metallic debris associated with a catastrophic failure of a battery pack. According to one embodiment, a battery pack includes a first lithium-ion battery cell; a first magnetic surface; and an enclosure. The first magnetic surface may be configured (e.g. positioned) to attract metallic debris associated with a catastrophic failure of the first lithium-ion battery cell. The catastrophic failure may be a result of thermal runaway of the first lithium-ion battery cell.

43 Claims, 5 Drawing Sheets

BLOCK DIAGRAM
200

MITIGATING DISTRIBUTION OF DEBRIS ASSOCIATED WITH A CATASTROPHIC FAILURE OF A BATTERY CELL

TECHNICAL FIELD

The present invention relates generally to lithium-ion battery packs for uninterruptible power supply (UPS) systems. More specifically; methods, systems, and devices are disclosed for capturing lithium-ion cell debris following a breakdown where material escapes the cell enclosure.

BACKGROUND

Lithium-ion battery cells typically have a longer service life with a much greater cycle life than most other battery alternatives. For example, a lithium-ion battery cell may have discharge/charge cycles exceeding 5000 cycles. In contrast a valve regulated lead acid (VRLA) battery cell may be limited to 500 cycles. Additionally, lithium-ion battery cells are also lighter in weight and their costs have fallen 97% since 1991. For example, lithium-ion battery packs averaged almost S1100 per kilowatt hour (kWh) in 2010 and are currently below 5130/kWh. These costs are expected to be below 5100/kWh by 2023. However, a catastrophic failure mode of lithium-ion battery cells is thermal runaway. Thermal runaway is an unstoppable chain reaction caused when a lithium-ion battery cell or an area within the lithium-ion battery cell becomes elevated in temperature due to internal or external short circuiting, internal chemical cross-over, and/or external heating. Additionally, electro-chemical abuse from over-discharging and/or over-charging can produce thermal runaway. This self-feeding heating rate (positive feedback) within the lithium-ion battery cell eventually leads to a case rupture where the internal energy is released along with debris.

As such, new methods, systems, and devices are needed for mitigating damage and distribution of debris associated with a catastrophic failure of a lithium-ion battery pack.

SUMMARY

Disclosed herein are methods, systems, and devices for mitigating distribution of metallic debris associated with a catastrophic failure of a battery pack. According to one embodiment, a battery pack includes a first lithium-ion battery cell, a first magnetic surface, and an enclosure.

In some embodiments, the first magnetic surface may be configured (e.g. positioned) to attract metallic debris associated with a catastrophic failure of the first lithium-ion battery cell. In further embodiments, the catastrophic failure may be a result of thermal runaway of the first lithium-ion battery cell.

In some embodiments, the battery pack may further include a permanent magnet. In further embodiments, the permanent magnet may include at least one rare earth element.

In some embodiments, the permanent magnet may include the first magnet surface. In other embodiments, the first magnetic surface may be magnetized from being in proximity of the permanent magnet.

In further embodiments, the permanent magnet may be a Neodymium (NdFeB) magnet, a samarium cobalt (SmCo) magnet, an alnico magnet, and/or the like.

In some embodiments, the first magnetic surface comprises a plurality of fins. In other embodiments, the first magnetic surface may include a porous magnetic surface. For example the porous magnetic surface may include steel wool.

In some embodiments, the battery pack may further include a controller electrically coupled with battery monitoring circuitry. The controller may be configured to detect a catastrophic failure of the first lithium-ion battery cell via the battery monitoring circuitry.

In some embodiments, the battery pack may further include a communication interface electrically coupled with the controller. The controller may be further configured to transmit a failure message upon detecting the catastrophic failure of the first lithium-ion battery cell.

In some embodiments, the battery pack may further include a fan electrically coupled with the controller. The controller may be further configured to adjust a speed of the fan upon detecting the catastrophic failure of the first lithium-ion battery cell.

In some embodiments, the battery pack may further include an electronically controlled vent electrically coupled with the controller. The controller may be further configured to close the electronically controlled vent upon detecting the catastrophic failure of the first lithium-ion battery cell. In other embodiments, the controller may be further configured to adjust direction of air flow of the electronically controlled vent upon detecting the catastrophic failure of the first lithium-ion battery cell.

In some embodiments, the battery pack may further include an indicator electrically coupled with the controller. The controller may be further configured to activate the indicator upon detecting the catastrophic failure of the first lithium-ion battery cell. In further embodiments, the indicator may be a light emitting diode (LED), a liquid crystal display (LCD), and/or the like.

In some embodiments, the controller may be further configured to record a timestamp in non-volatile memory upon detecting the catastrophic failure of the first lithium-ion battery cell.

In some embodiments, the enclosure may include a first wall and the first wall may include the first magnetic surface. In further embodiments, the first wall may be a temporary magnet. In still further embodiments, the first wall may be magnetized from being in proximity of a permanent magnet. In other embodiments, the first wall may be magnetized from being in proximity of an electromagnet.

In some embodiments, the battery pack may further include a controller electrically coupled with the battery monitoring circuitry and the electromagnet. The controller may be configured to energize the electromagnet upon detecting an imminent catastrophic failure of the first lithium-ion battery cell via the battery monitoring circuitry.

In some embodiments, the battery pack may further include a permanent magnet and the first magnetic surface may be magnetized from being in proximity of the permanent magnet. In other embodiments, the battery pack may further include an electromagnet and the first magnetic surface may be configured to be magnetized from being in proximity of the electromagnet.

In some embodiments, the battery pack may be configured to be a field replaceable battery pack.

In some embodiments, the battery pack may be further configured to be installed in an uninterruptible power supply (UPS) system. In further embodiments, the UPS system may include an alternating current (AC) to direct current (DC) rectifier configured to be electrically coupled with an AC source, a DC to AC inverter configured to be electrically coupled with an AC load, a DC bus electrically coupled between the AC to DC rectifier and the DC to AC inverter, and a battery cabinet electrically coupled with the DC bus. In still further embodiments, the battery pack may be further configured to be installed and/or replaced in the battery cabinet for maintenance.

In some embodiments, the battery pack may further include a plurality of lithium-ion battery cells and the plurality of lithium-ion battery cells may include the first lithium-ion battery cell. In further embodiments, the plurality of lithium-ion battery cells may be configured in a series arrangement. In other embodiments, the plurality of lithium-ion battery cells may be configured in a parallel arrangement.

In some embodiments, the battery pack may further include a plurality of lithium-ion battery tiers configured in a series arrangement. Each lithium-ion battery tier may include a plurality of lithium-ion battery cells configured in a parallel arrangement. The first lithium-ion battery cell may be implemented in at least one of the lithium-ion battery tiers.

In some embodiments, the first magnetic surface may be field replaceable.

In some embodiments, the first magnetic surface may include a plurality of vents allowing air to pass through.

In some embodiments, the first magnetic surface may be implemented on a screen mesh. In further embodiments, the first magnetic surface the screen mesh may be field replaceable. In still further embodiments, the screen mesh may be configured to vent air from the enclosure.

In another embodiment, a method of manufacturing a battery pack is disclosed. The method includes mechanically installing a first lithium-ion battery cell in an enclosure and mechanically installing a magnet in the enclosure. The magnet is configured to provide a magnetic force to attract metallic debris associated with a catastrophic failure of the first lithium-ion battery cell.

In some embodiments, the magnet may be a permanent magnet, an electromagnet, and/or the like.

In another embodiment, a method implemented by a controller within a battery pack having a first lithium-ion battery cell is disclosed. The method includes detecting an imminent catastrophic failure of the first lithium-ion battery cell. The battery pack further includes a first magnetic surface configured to attract metallic debris associated with a catastrophic failure of the first lithium-ion battery cell. The method further includes storing a timestamp in non-volatile memory associated with the catastrophic failure.

In some embodiments, the battery pack may further include a communication interface electrically coupled with the controller and the method may further include transmitting a failure message upon detecting the catastrophic failure of the first lithium-ion battery cell.

In some embodiments, the battery pack may further include a fan electrically coupled with the controller and the method may further include adjusting a speed of the fan upon detecting the catastrophic failure of the first lithium-ion battery cell.

In some embodiments, the battery pack may further include an electronically controlled vent electrically coupled with the controller and the method may further include closing the electronically controlled vent upon detecting the catastrophic failure of the first lithium-ion battery cell. In other embodiments, the method may further include adjusting direction of air flow of the electronically controlled vent upon detecting the catastrophic failure of the first lithium-ion battery cell.

In some embodiments, the battery pack may further include an indicator electrically coupled with the controller and the method may further include activating the indicator upon detecting the catastrophic failure of the first lithium-ion battery cell. In further embodiments, the indicator may be a light emitting diode (LED), a liquid crystal display, and/or the like.

In another embodiment, a non-transitory computer-readable storage medium is disclosed. The non-transitory computer-readable storage medium stores instructions to be implemented on a controller within a battery pack having a first lithium-ion battery cell. The instructions when executed by the controller provide a method for detecting an imminent catastrophic failure of the first lithium-ion battery cell. The battery pack further includes a first magnetic surface configured to attract metallic debris associated with a catastrophic failure of the first lithium-ion battery cell. The method further includes storing a timestamp in non-volatile memory associated with the catastrophic failure.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
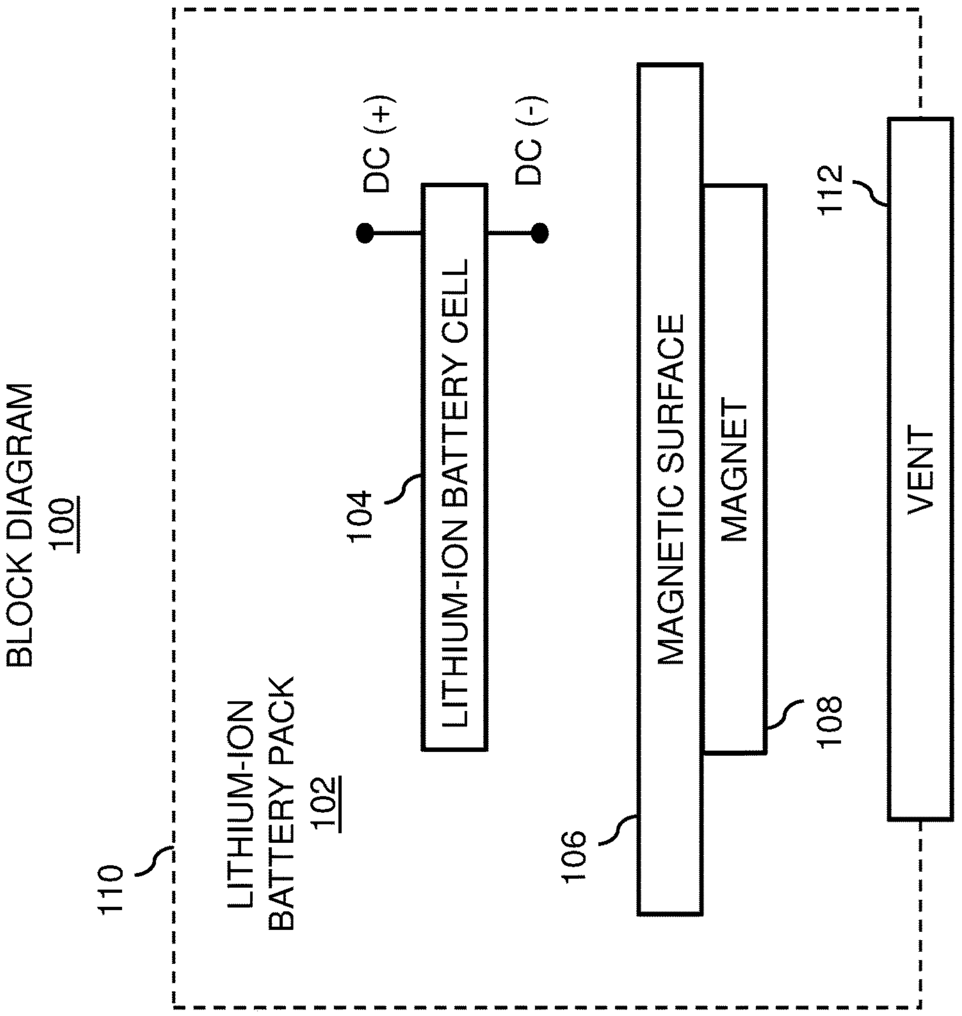
FIG. 1 depicts a block diagram illustrating a lithium-ion battery pack comprising a lithium-ion battery cell, a magnetic surface, a magnet, and an enclosure with a vent in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to “one embodiment” or “an embodiment” in the present disclosure can be, but not necessarily are, references to the same embodiment and such references mean at least one of the embodiments.

Reference in this specification to “one embodiment” or “an embodiment” means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, systems, and devices for mitigating distribution of metallic debris associated with a catastrophic failure of a battery pack. There are numerous conditions (e.g. thermal runaway, etc.) that may cause a lithium-ion cell to explode and/or break open. Most lithium-ion cells are designed to allow a cathode end to separate to relieve built up pressure. However, this separation leads to the release of debris into the surrounding environment. Through experimentation, much of the debris from these catastrophic failures has been determined to be metallic dust particles. By utilizing one or more magnets at appropriate locations some amount of the metallic debris may be contained from exiting an enclosure housing the lithium-ion cell and/or entering the surrounding environment. This reduces dangerous chemicals and metals that may be released and possibly create a safety hazard for nearby workers. One or magnets may be placed near an air exhaust vent either within or external of a battery pack containing one or more lithium-ion battery cells. Additionally, one or more magnets may be placed near the one or more lithium-ion battery cells within the battery pack. Further the air exhaust vent may be magnetized to catch debris before exit. For example, a magnetized screen mesh may be used that is field replaceable.

FIG. 1 depicts a block diagram illustrating a lithium-ion battery pack 102 in accordance with embodiments of the present disclosure. The lithium-ion battery pack 102 includes a lithium-ion battery cell 104, a magnetic surface 106, and a magnet 108, within an enclosure 110 having a vent 112. The magnetic surface 106 is positioned to attract metallic debris associated with a catastrophic failure of the lithium-ion battery cell 104. The catastrophic failure may be a result of thermal runaway of the first lithium-ion battery cell. In one scenario, the magnetic surface 106 may be positioned closely to a predicted rupture point of the lithium-ion cell 104. In another scenario, the magnetic surface 106 may be positioned closely to the vent 112. In still another scenario, multiple magnetic surfaces may be positioned closely to the vent 112 and closely to the lithium-ion cell 104.

The magnet 108 may be a permanent magnet such as a neodymium (NdFeB) magnet, a samarium cobalt (SmCo) magnet, an alnico magnet, and/or the like. The magnetic surface 106 may be configured as a temporary magnet and may be magnetized from proximity of the magnet 108. For example the magnetic surface 106 may include annealed iron, steel, nickel, and/or the like. In another scenario, the magnetic surface 106 may be part of an exposed surface area of the permanent magnet.

The magnetic surface 106 may also include a plurality of fins (not shown in FIG. 1) to provide more magnetic surface area for collection of the metallic debris. Additionally the magnetic surface 106 may be built into the enclosure 110 and/or the vent 112. For example, the magnetic surface 106 may be implemented as a screen mesh associated with the vent 112. The screen mesh may be removable to be cleaned and/or replaced. The magnetic surface 106 may also include a porous magnetic surface. For example the porous magnetic surface may include steel wool.

Figure 2:
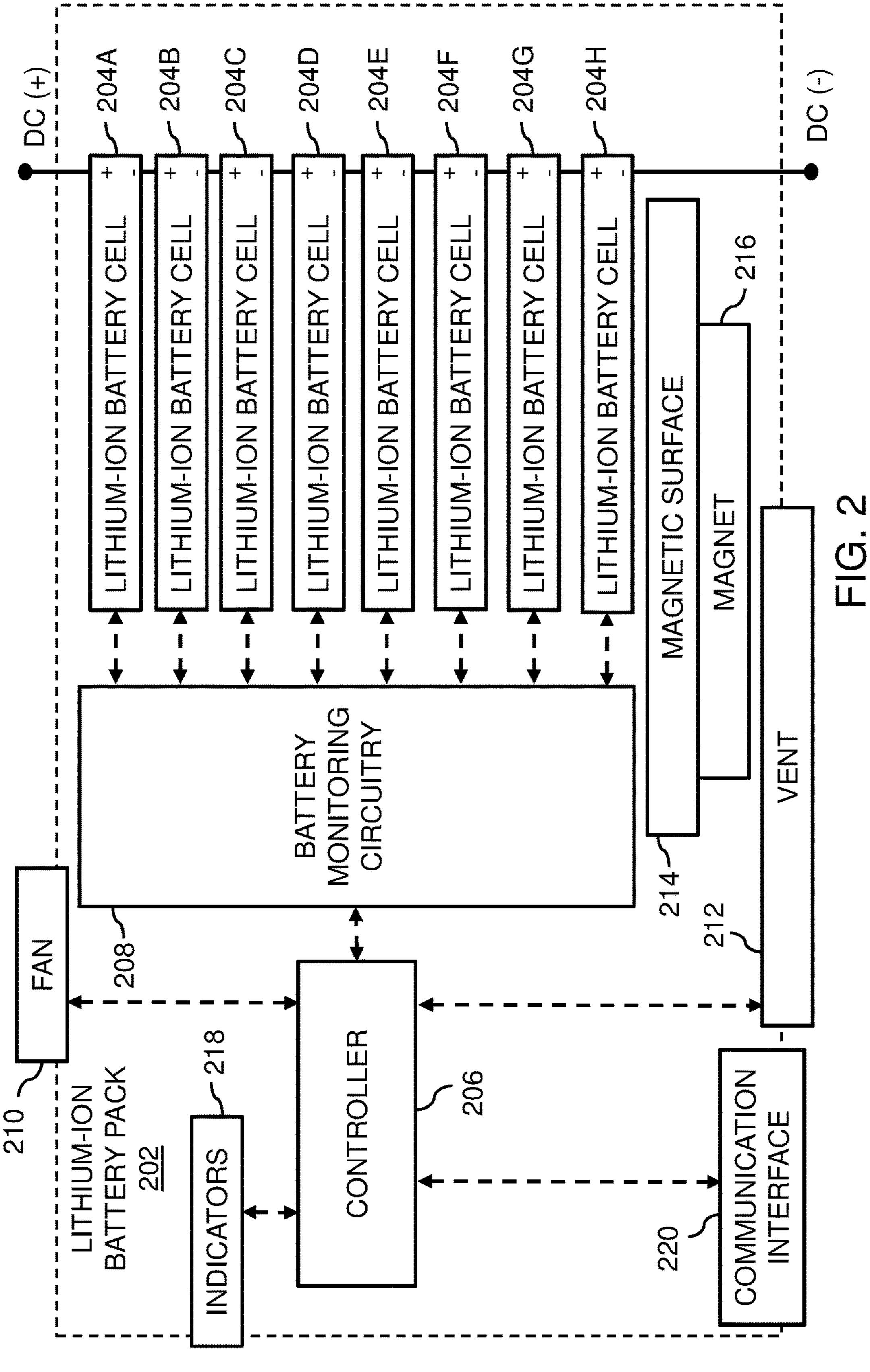
FIG. 2 depicts a block diagram illustrating another lithium-ion battery pack comprising a plurality of lithium-ion battery cells, a magnetic surface, a magnet, a controller, battery monitoring circuitry, and an enclosure with a vent and a fan in accordance with embodiments of the present disclosure.

FIG. 2 depicts a block diagram 200 illustrating another lithium-ion battery pack 202 in accordance with embodiments of the present disclosure. For example, the lithium-ion battery pack 202 may be a field replaceable battery pack for an uninterruptible power supply (UPS) system. The lithium-ion battery pack 202 includes a plurality of lithium-ion battery cells 204A-204H, a controller 206, battery monitoring circuitry 208, a fan 210, a vent 212, a magnetic surface 214, a magnet 216, indicators 218, and a communication interface 220.

The plurality of lithium-ion battery cells 204A-204H are configured in a series arrangement between a positive terminal and a negative terminal. In an alternate scenario the plurality of lithium-ion battery cells 204A-204H may be configured in a parallel arrangement between the positive terminal and the negative terminal. In still another scenario, the plurality of lithium-ion battery cells 204A-204H may include parallel arrangements and series arrangements. For example, lithium-ion battery cells 204A-204D may be in a parallel arrangement forming a first battery tier and lithium-ion battery cells 204E-204H may be in a parallel arrangement forming a second battery tier. The first battery tier and the second battery tier may be in a series arrangement between the positive terminal and the negative terminal (i.e. 2S4P configuration).

The fan 210 may be an electronically controlled fan configured to have an airflow adjusted by the controller 206 in addition to turning the fan 210 off. The fan 210 may be configured for air flow into the enclosure 210 and/or exhaust air from the enclosure. The vent 212 may be an electronically controlled vent configured to be opened and closed by the controller 206. Additionally, the vent 212 may be configured to adjust a direction of air flow. The magnetic surface 214 and the magnet 216 may be similar to the magnetic surface 106 and the magnet 108 disclosed in the implementations of the lithium-ion battery pack 102 of FIG. 1.

The battery monitoring circuitry 208 includes test/measurement/control circuitry electrically coupled with the controller 206. The battery monitoring circuitry 208 may be configured to measure temperature within the plurality of lithium-ion battery cells 204A-204H. The battery monitoring circuitry 208 may also be configured to measure state of charge (SOC) and state of health (SOH) of the plurality of lithium-ion battery cells 204A-204H. The battery monitoring circuitry 208 may be further configured to measure ohmic values at different frequencies to determine the SOH. For example the battery monitoring circuitry 208 may be configured to induce a current at DC and/or other predetermined frequencies for predetermined time periods while measuring a voltage across a given lithium-ion cell of interest filtered to the predetermined frequency. The battery monitoring circuitry 208 may utilize separate current and voltage leads to increase the accuracy of the ohmic value measurement. The battery monitoring circuitry 208 may also include an accelerometer for measuring vibration data. In certain embodiments, the accelerometer may be a three-axis accelerometer. The battery monitoring circuitry 208 may also include a plurality of integrated shunt resistors and/or a plurality of integrated load circuits electrically coupled with the plurality of battery cells. The controller 206 may include non-volatile memory and a real-time clock embedded within or externally coupled with controller 206.

Indicators 218 are electrically coupled with the controller 206 and are configured to provide a status of the lithium-ion battery pack 202. The indicators 228 may provide a charge level of the plurality of lithium-ion battery cells 204A-204H and whether the plurality of lithium-ion battery cells 204A-204H are being charged or discharged. Additionally, the indicators may indicate a pending catastrophic failure or actual catastrophic failure of a lithium-ion battery cell. The indicators 218 may be one or more light-emitting diodes (LEDs), one or more liquid-crystal-displays (LCDs), and/or the like.

The communication interface 220 may be a wired communication port such as an Ethernet interface, an RS-232 interface, an RS-422 interface, or the like. The communication interface 220 may be at least partially compliant to a controller area network (CAN) bus, an Inter Equipment Bus (IEBus), General Purpose Interface Bus (GPIB), or the like. The communication port may also be a wireless communication interface such as a cellular interface (e.g. 2G, 3G, 4G, 5G, etc.), a WiFi interface, a Bluetooth® interface, or the like. The communication port may also be an optical communication port such as an optical Ethernet interface. In some embodiments, the communication interface 220 may include a plurality of the aforementioned communication ports.

Figure 3:
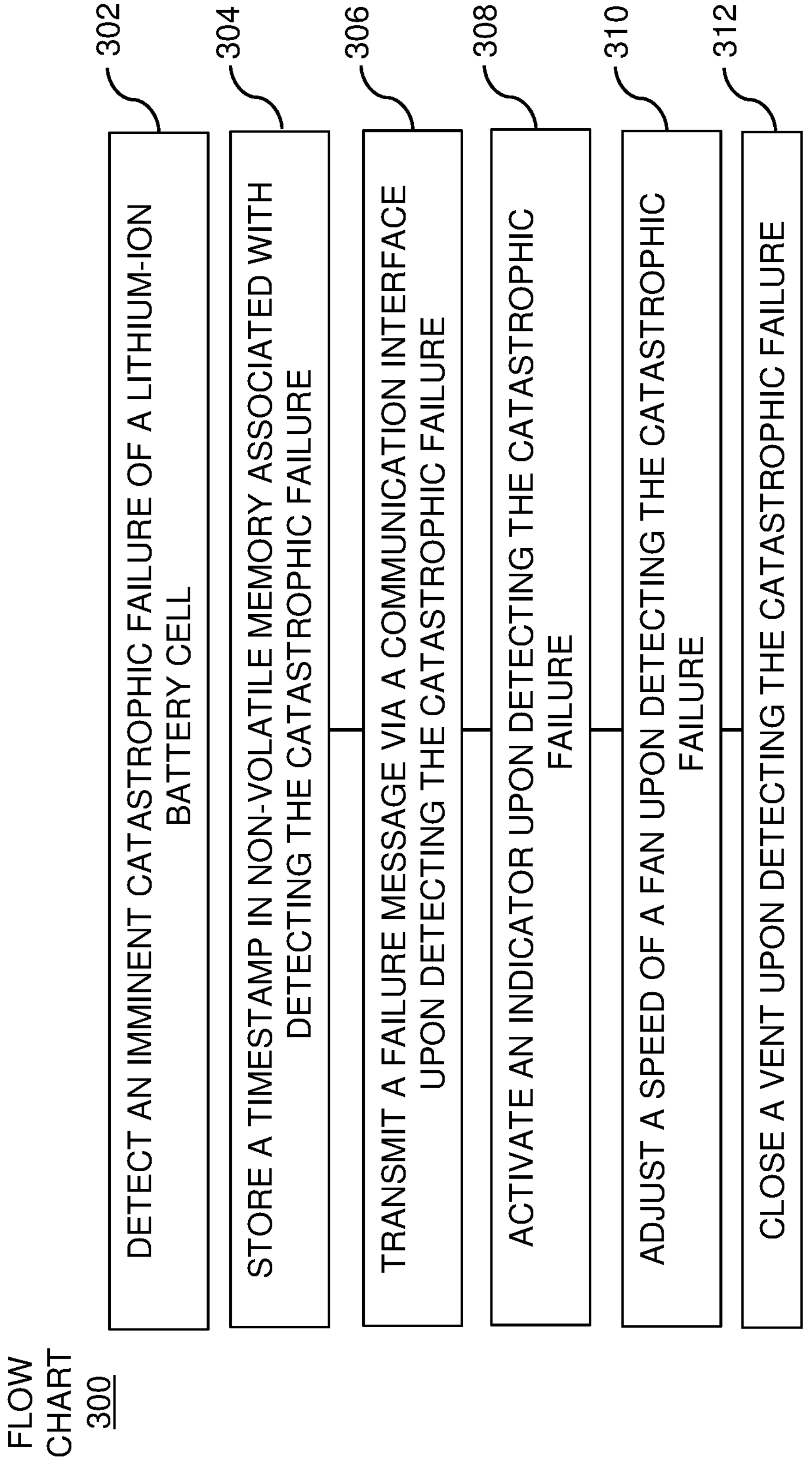
FIG. 3 depicts a flowchart illustrating a method implemented by the controller of the lithium-ion battery pack of FIG. 2 in accordance with embodiments of the present disclosure.

FIG. 3 depicts a flowchart 300 illustrating a method implemented by the controller 206 of the lithium-ion battery pack 202 of FIG. 2 in accordance with embodiments of the present disclosure.

In step 302, the method includes detecting an imminent catastrophic failure of one of the plurality of lithium-ion battery cells 204A-204H via the battery monitoring circuitry 208. For example the battery monitory circuitry 208 may monitor an integrated internal sensor embedded within each of the plurality of lithium-ion battery cells 204A-204H. The integrated internal sensor may be a resistive temperature detector (RTD). When the controller 206 detects a specified slope of a temperature versus time of the RTD, a thermal runaway condition may be assumed with an impending catastrophic failure to occur.

In step 304, the method further includes storing a timestamp in non-volatile memory associated with the catastrophic failure. The timestamp may be used for failure diagnostics such as associating the thermal runaway with another event. For example, the thermal runaway may have occurred during an over charging interval or an over discharging interval. Other associated event could be an increase in ambient temperature within or external to the lithium-ion battery pack 202 detected by another RTD, or an impact to the lithium-ion battery pack 202 detected by an accelerometer.

In step 306, the method further includes transmitting a failure message via the communication interface 220 upon detecting the pending catastrophic failure. The message may be transmitted to a master controller overseeing several battery packs or to a server based monitoring system. The server may be within a cloud computing environment. In another scenario the message may be transmitted to a mobile device (e.g. smart phone, smart tablet, smart watch, etc.) of maintenance person.

In step 308, the method further includes activating on or more indicators 218 upon detecting the pending catastrophic failure.

In step 310, the method further includes adjusting a speed of the fan 210 upon detecting the pending catastrophic failure. For example, the fan 210 may be turned off by the controller 206 upon detecting the pending catastrophic failure.

In step 312, the method further includes closing the vent 212 upon detecting the pending catastrophic failure of the first lithium-ion battery cell.

Figure 4:
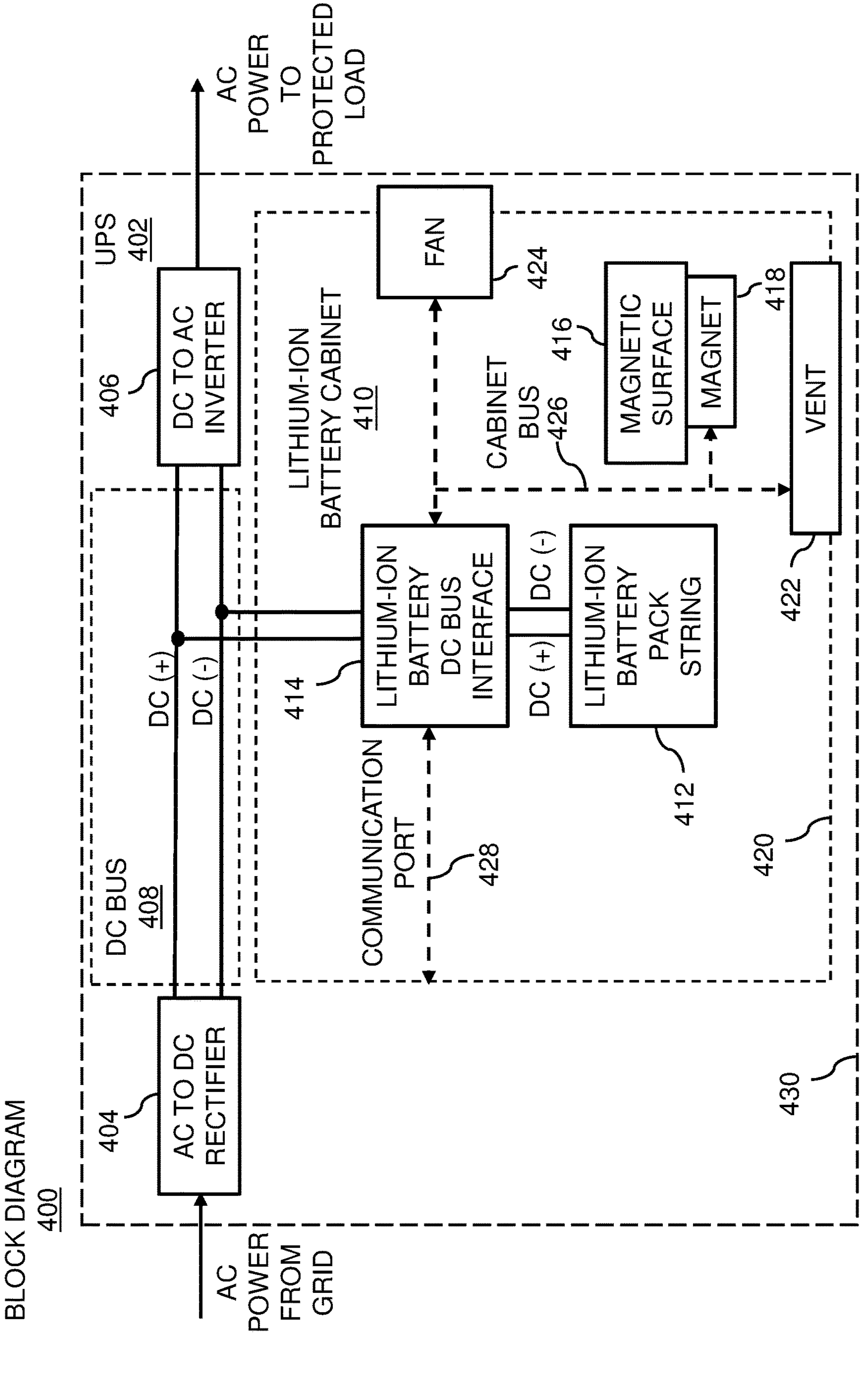
FIG. 4 depicts a block diagram illustrating an uninterruptible power supply (UPS) system including a lithium-ion battery cabinet including a lithium-ion battery string, a magnetic surface, a magnet, an enclosure with a vent and a fan in accordance with embodiments of the present disclosure.

FIG. 4 depicts a block diagram 400 illustrating an uninterruptible power supply (UPS) system 402 in accordance with embodiments of the present disclosure. The UPS system 402 includes an alternating current (AC) to direct current (DC) rectifier 404 electrically coupled with a DC to AC inverter 406 via a DC bus 408. The AC to DC rectifier 404 is configured to receive AC power from an electrical grid. The electrical grid may provide three phase AC power, split-phase AC power, single phase AC power, or the like to an input of the AC to DC rectifier 404. The DC to AC inverter 406 is configured to provide AC power to a protected load. The protected load may be telecom equipment, a datacenter, a hospital or other medical facility, an industrial facility, a home residence, and/or the like. The AC power supplied to the protected load may be three phase AC power, split-phase AC power, single phase AC power, or the like.

A lithium-ion battery cabinet 410 is electrically coupled with the DC bus 106 to provide uninterrupted power to the DC to AC inverter 406 upon a failure of the electrical grid. The lithium-ion battery cabinet 410 includes a lithium-ion battery string 412 electrically coupled with a lithium-ion battery bus interface 414.

The lithium-ion battery cabinet 410 also includes a magnetic surface 416, and a magnet 418 within an enclosure 420 having a vent 422 and a fan 424. The magnetic surface 416 is positioned to attract metallic debris associated with a catastrophic failure of any lithium-ion battery cell within the lithium-ion battery string 412. The catastrophic failure may be a result of thermal runaway of the lithium-ion battery cell.

In one scenario, the magnetic surface 106 may be positioned closely to the lithium-ion battery string 412. In another scenario, the magnetic surface 416 may be positioned closely to the vent 422. In still another scenario, multiple magnetic surfaces may be positioned closely to the vent 422 and closely to the lithium-ion battery string 412. In still another scenario, the magnetic surface 416 may be positioned closely to the fan 424, wherein the fan 424 is configured to exhaust air from the enclosure 420

The lithium-ion battery cabinet 410 also includes a cabinet bus 426 for communication (including monitoring and control) between the lithium-ion battery bus interface 414 and the lithium-ion battery string 412. The cabinet bus 426 may be at least partially compliant to a controller area network (CAN) bus, Ethernet bus, an Inter Equipment Bus (IEBus), General Purpose Interface Bus (GPIB), or the like. The lithium-ion battery bus interface 114 also includes a communication port 428 for external monitoring and control of the lithium-ion battery cabinet 410. The communication port 428 may be a wired communication port such as an Ethernet interface, an RS-232 interface, an RS-422 interface, or the like. The communication port 428 may also be a wireless communication port such as a WiFi interface, a Bluetooth® interface, or the like. The communication port 428 may also be an optical communication port such as an optical Ethernet interface. In some embodiments, the communication port 428 may include a plurality of the aforementioned communication ports.

The fan 424 may be an electronically controlled fan configured to have an airflow adjusted by a controller within the lithium-ion battery bus interface 414. Additionally, the controller may be configured to turn the fan 424 off and back on. The fan 424 may be configured for air flow into the enclosure 420 and/or exhaust air from the enclosure 420. The vent 422 may be an electronically controlled vent configured to be opened and closed by the controller. The controller may be configured to implement a method similar to flowchart 300 of FIG. 3. Additionally, the magnet 418 may be an electromagnet configured to be activated by the controller upon detecting an imminent catastrophic failure of one of the lithium-ion battery cells. The magnetic surface 416 may also include a plurality of fins (not shown in FIG. 4) to provide more magnetic surface area for collection of the metallic debris. Additionally the magnetic surface 416 may be built into the enclosure 420 and/or the vent 422. For example, the magnetic surface 416 may be implemented as a screen mesh associated with the vent 422. The screen mesh may be removable to be cleaned and/or replaced.

In another scenario, the magnetic surface 416, the magnet 418, the vent, and the fan 424 may be implemented in any of the previously described manners within an enclosure 430 housing the AC to DC rectifier 404, the DC to AC inverter 406, the DC bus 408, and the lithium-ion battery cabinet 410.

Figure 5:
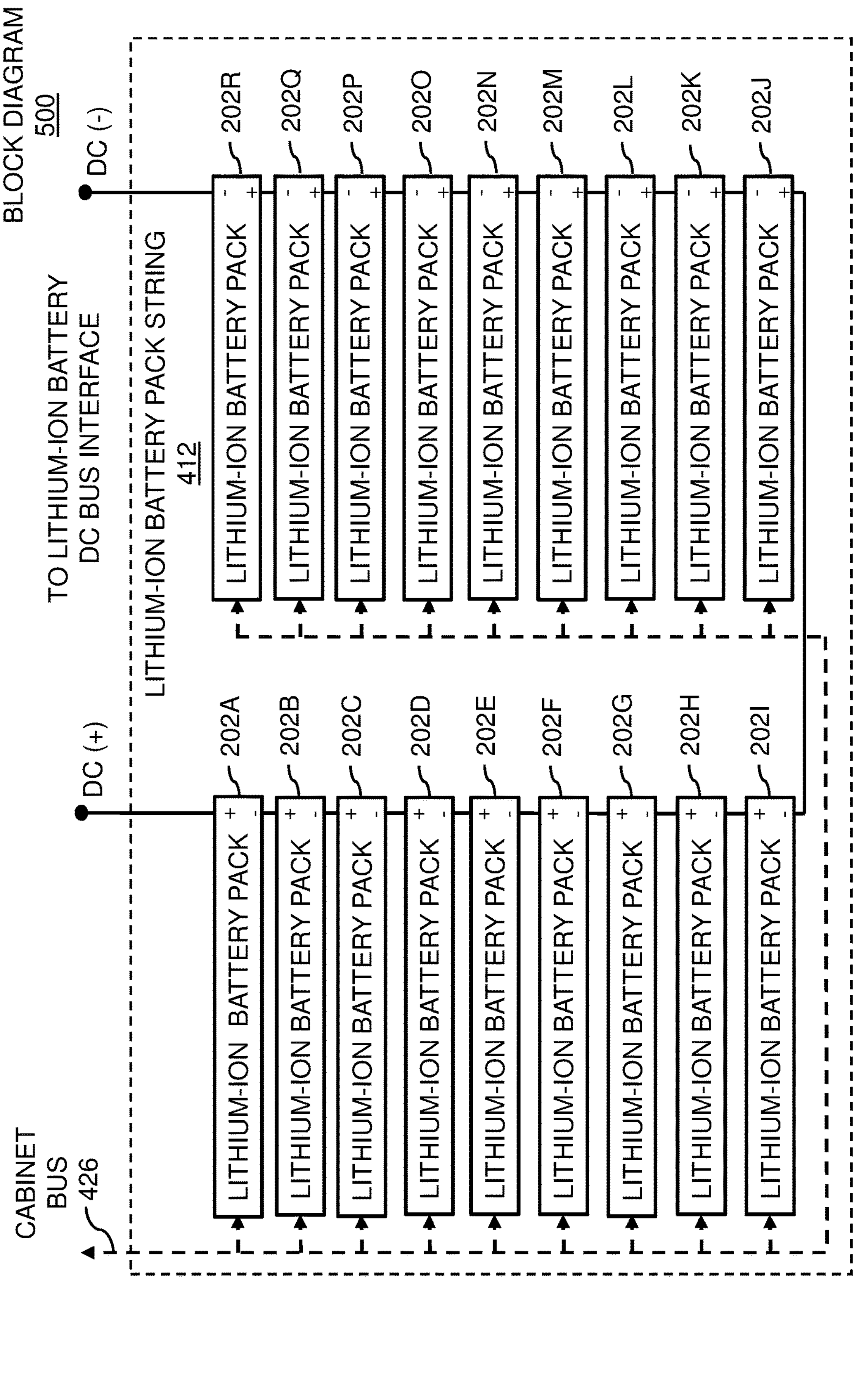
FIG. 5 depicts a block diagram illustrating the lithium-ion battery string of FIG. 4 in accordance with embodiments of the present disclosure.

FIG. 5 depicts a block diagram 500 illustrating the lithium-ion battery string 412 of FIG. 4 in accordance with embodiments of the present disclosure. The lithium-ion battery string 412 includes eighteen lithium-ion battery packs 202A—202R configured in a series arrangement between a positive DC (+) terminal and a negative DC (−) terminal. The lithium-ion battery string 412 may include more or less lithium-ion battery packs. The cabinet bus 426 of block diagram 400 of FIG. 4 is electrically coupled with the eighteen lithium-ion battery packs 202A—202R to provide monitoring and per pack test capability.

The magnetic surface 416, the magnet 418, the vent 422, and the fan 424 of FIG. 4 may be implemented in addition to the magnetic surface 214, the magnet 216, the vent 212, and the fan 210 each of the lithium-ion battery packs 202A—202R as disclosed in FIG. 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. For example, programming languages may include, but are not limited to: Ruby, JavaScript, Java, Python, Ruby, PHP, C, C++, C #, Objective-C, Go, Scala, Swift, Kotlin, OCaml, or the like.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A battery pack comprising:

a first lithium-ion battery cell;

a first magnetic surface; and an enclosure having a vent, wherein:

the first magnetic surface is positioned in proximity to the vent; and the first magnetic surface is magnetized from a proximity of a permanent magnet.

2. The battery pack of claim 1, wherein the first magnetic surface is configured to attract metallic debris associated with a catastrophic failure of the first lithium-ion battery cell.

3. The battery pack of claim 2, wherein the catastrophic failure is a result of thermal runaway of the first lithium-ion battery cell.

4. The battery pack of claim 1, wherein the permanent magnet comprises at least one rare earth element.

5. The battery pack of claim 1, wherein the permanent magnet is at least one of a Neodymium (NdFeB) magnet, a samarium cobalt (SmCo) magnet, and an alnico magnet.

6. The battery pack of claim 1 further comprising a controller electrically coupled with battery monitoring circuitry, and the controller is configured to detect a catastrophic failure of the first lithium-ion battery cell via the battery monitoring circuitry.

7. The battery pack of claim 6 further comprising a communication interface electrically coupled with the controller and the controller is further configured to transmit a failure message upon detecting the catastrophic failure of the first lithium-ion battery cell.

8. The battery pack of claim 6 further comprising a fan electrically coupled with the controller, and the controller is further configured to adjust a speed of the fan upon detecting the catastrophic failure of the first lithium-ion battery cell.

9. The battery pack of claim 6 further comprising an indicator electrically coupled with the controller, and the controller is further configured to activate the indicator upon detecting the catastrophic failure of the first lithium-ion battery cell.

10. The battery pack of claim 9, wherein the indicator is at least one of a light emitting diode and a liquid crystal display.

11. The battery pack of claim 6, wherein the controller is further configured to record a timestamp in non-volatile memory upon detecting the catastrophic failure of the first lithium-ion battery cell.

12. The battery pack of claim 1, wherein the battery pack is configured to be a field replaceable battery pack.

13. The battery pack of claim 12, wherein the battery pack is further configured to be installed in an uninterruptible power supply (UPS) system.

14. The battery pack of claim 13, wherein:
- the UPS system comprises:
  - an alternating current (AC) to direct current (DC) rectifier configured to be electrically coupled with an AC source;
  - a DC to AC inverter configured to be electrically coupled with an AC load;
  - a DC bus electrically coupled between the AC to DC rectifier and the DC to AC inverter; and
  - a battery cabinet electrically coupled with the DC bus; and
- the battery pack is further configured to be installed in the battery cabinet.

15. The battery pack of claim 1 further comprising a plurality of lithium-ion battery cells and the plurality of lithium-ion battery cells includes the first lithium-ion battery cell.

16. The battery pack of claim 15, wherein the plurality of lithium-ion battery cells is configured in a series arrangement.

17. The battery pack of claim 15, wherein the plurality of lithium-ion battery cells is configured in a parallel arrangement.

18. The battery pack of claim 1, wherein the first magnetic surface is field replaceable.

19. A battery pack comprising:
- a first lithium-ion battery cell;
- a first magnetic surface; and
- an enclosure, wherein the first magnetic surface comprises a plurality of fins.

20. A battery pack comprising:
- a first lithium-ion battery cell;
- a first magnetic surface;
- an enclosure;
- a controller electrically coupled with battery monitoring circuitry, wherein the controller is configured to detect a catastrophic failure of the first lithium-ion battery cell via the battery monitoring circuitry; and
- an electronically controlled vent electrically coupled with the controller, wherein the controller is further configured to close the electronically controlled vent upon detecting the catastrophic failure of the first lithium-ion battery cell.

21. A battery pack comprising:
- a first lithium-ion battery cell;
- a first magnetic surface;
- an enclosure;
- a controller electrically coupled with battery monitoring circuitry, wherein the controller is configured to detect a catastrophic failure of the first lithium-ion battery cell via the battery monitoring circuitry; and
- an electronically controlled vent electrically coupled with the controller, wherein the controller is further configured to adjust direction of air flow of the electronically controlled vent upon detecting the catastrophic failure of the first lithium-ion battery cell.

22. A battery pack comprising:
- a first lithium-ion battery cell;
- a first magnetic surface; and
- an enclosure having a vent, wherein:
  - the enclosure comprises a first wall;
  - the first magnetic surface is positioned in proximity to the vent; and
  - the first wall comprises the first magnetic surface.

23. A battery pack comprising:
- a first lithium-ion battery cell;
- a first magnetic surface; and
- an enclosure, wherein:
  - the enclosure comprises a first wall;
  - the first wall is a temporary magnet; and
  - the first wall comprises the first magnetic surface.

24. The battery pack of claim 23, wherein the first wall is magnetized from a proximity of a permanent magnet.

25. The battery pack of claim 23, wherein the first wall is magnetized from a proximity of an electromagnet.

26. The battery pack of claim 25 further comprising a controller electrically coupled with battery monitoring circuitry and the electromagnet, and the controller is configured to energize the electromagnet upon detecting an imminent catastrophic failure of the first lithium-ion battery cell via the battery monitoring circuitry.

27. A battery pack comprising:
- a first lithium-ion battery cell;
- a first magnetic surface;
- an enclosure having a vent; and
- a permanent magnet, wherein:
  - the first magnetic surface is positioned in proximity to the vent; and
  - the first magnetic surface is configured to be magnetized from a proximity of the permanent magnet.

28. A battery pack comprising:
- a first lithium-ion battery cell;
- a first magnetic surface;
- an enclosure having a vent; and
- an electromagnet, wherein:
  - the first magnetic surface is positioned in proximity to the vent; and
  - the first magnetic surface is configured to be magnetized from a proximity of the electromagnet.

29. A battery pack comprising:
- a first lithium-ion battery cell;
- a first magnetic surface; and
- an enclosure, wherein the first magnetic surface includes a plurality of vents allowing air to pass through.

30. A battery pack comprising:
- a first lithium-ion battery cell;
- a first magnetic surface; and
- an enclosure, wherein the first magnetic surface is implemented on a screen mesh.

31. The battery pack of claim 30, wherein the screen mesh is field replaceable.

32. The battery pack of claim 30, wherein the screen mesh is configured to vent air from the enclosure.

33. A battery pack comprising:
- a first lithium-ion battery cell;
- a first magnetic surface; and
- an enclosure, wherein the first magnetic surface is a porous magnetic surface.

34. The battery pack of claim 33, wherein the porous magnetic surface comprises steel wool.

35. A method of manufacturing a battery pack, the method comprising:
- mechanically installing a first lithium-ion battery cell in an enclosure having a vent; and mechanically installing a permanent magnet in the enclosure, wherein:

the battery pack includes a first magnetic surface;

the first magnetic surface is positioned in proximity to the vent; and the first magnetic surface is magnetized from a proximity of the permanent magnet.

36. The method of claim 35, wherein the permanent magnet is configured to provide a magnetic force to attract metallic debris associated with a catastrophic failure of the first lithium-ion battery cell.

37. A method implemented by a controller within a battery pack having a first lithium-ion battery cell, the method comprising:

detecting an imminent catastrophic failure of the first lithium-ion battery cell, wherein the battery pack further includes a first magnetic surface configured to attract metallic debris associated with a catastrophic failure of the first lithium-ion battery cell; and storing a timestamp in non-volatile memory associated with the catastrophic failure, wherein:

the battery pack further includes an electronically controlled vent electrically coupled with the controller; and the method further includes closing the electronically controlled vent upon detecting the catastrophic failure of the first lithium-ion battery cell.

38. The method of claim 37, wherein:

the battery pack further includes a communication interface electrically coupled with the controller; and the method further includes transmitting a failure message upon detecting the catastrophic failure of the first lithium-ion battery cell.

39. The method of claim 37, wherein:

the battery pack further includes a fan electrically coupled with the controller; and the method further includes adjusting a speed of the fan upon detecting the catastrophic failure of the first lithium-ion battery cell.

40. The method of claim 37, wherein the battery pack further includes an indicator electrically coupled with the controller; and the method further includes activating the indicator upon detecting the catastrophic failure of the first lithium-ion battery cell.

41. A method implemented by a controller within a battery pack having a first lithium-ion battery cell, the method comprising:

detecting an imminent catastrophic failure of the first lithium-ion battery cell, wherein the battery pack further includes a first magnetic surface configured to attract metallic debris associated with a catastrophic failure of the first lithium-ion battery cell; and storing a timestamp in non-volatile memory associated with the catastrophic failure, wherein:

the battery pack further includes an electronically controlled vent electrically coupled with the controller; and the method further includes adjusting direction of air flow of the electronically controlled vent upon detecting the catastrophic failure of the first lithium-ion battery cell.

42. A non-transitory computer-readable storage medium, the non-transitory computer-readable storage medium storing instructions to be implemented on a controller within a battery pack having a first lithium-ion battery cell, the instructions when executed by the controller provide a method for:

detecting an imminent catastrophic failure of the first lithium-ion battery cell, wherein the battery pack further includes a first magnetic surface configured to attract metallic debris associated with a catastrophic failure of the first lithium-ion battery cell; and storing a timestamp in non-volatile memory associated with the catastrophic failure, wherein:

the battery pack further includes an electronically controlled vent electrically coupled with the controller; and the method further includes closing the electronically controlled vent upon detecting the catastrophic failure of the first lithium-ion battery cell.

43. A non-transitory computer-readable storage medium, the non-transitory computer-readable storage medium storing instructions to be implemented on a controller within a battery pack having a first lithium-ion battery cell, the instructions when executed by the controller provide a method for:

detecting an imminent catastrophic failure of the first lithium-ion battery cell, wherein the battery pack further includes a first magnetic surface configured to attract metallic debris associated with a catastrophic failure of the first lithium-ion battery cell; and storing a timestamp in non-volatile memory associated with the catastrophic failure, wherein:

the battery pack further includes an electronically controlled vent electrically coupled with the controller; and the method further includes adjusting direction of air flow of the electronically controlled vent upon detecting the catastrophic failure of the first lithium-ion battery cell.

* * * * *